United States Patent [19]

Huber

[11] Patent Number: 5,022,513
[45] Date of Patent: Jun. 11, 1991

[54] DRIVE ROLLER UNIT

[75] Inventor: Thomas Huber, Iffeldorf, Fed. Rep. of Germany

[73] Assignee: Bavaria Cargo Technologie GmbH, Fed. Rep. of Germany

[21] Appl. No.: 507,274

[22] Filed: Apr. 10, 1990

[30] Foreign Application Priority Data

Nov. 17, 1989 [DE] Fed. Rep. of Germany ....... 3938338

[51] Int. Cl.$^5$ .............................................. B65G 13/02
[52] U.S. Cl. ...................................... 198/782; 198/788
[58] Field of Search ......................... 198/780, 782, 788

[56] References Cited

U.S. PATENT DOCUMENTS 4,697,694 10/1987 Huber .................................. 198/782
4,792,037 12/1988 Huber .................................. 198/788

FOREIGN PATENT DOCUMENTS 882373 5/1953 Fed. Rep. of Germany .
8816438 10/1989 Fed. Rep. of Germany .
8816547 2/1990 Fed. Rep. of Germany .

OTHER PUBLICATIONS

Mechanical Engineering, Band 109, Nr. 4, Apr. 1987, Seiten 40–42, New York, U.S. "Conveyor Components Keep Rolling Along".

Primary Examiner—Joseph E. Valenza
Assistant Examiner—Tuan N. Nguyen
Attorney, Agent, or Firm—Surghue, Mion, Zinn, Macpeak & Seas

[57] ABSTRACT

A drive roller unit for driving articles on a conveyor track includes a drive roller which can be driven in rotation by an electric motor by way of a planetary transmission and a transmission arrangement including a drive gear. The drive roller is mounted rotatably on a guide body by means of which it is movable with respect to a base of the unit between a lower rest position and an upper drive position in which it is in engagement with the underside of the article to be driven. The guide body is mounted rotatably with respect to the electric motor. A first motor element such as the stator of the electric motor is rigidly and non-rotatably connected to the base while a second motor element is coupled to the sun wheel of the planetary transmission. The crown wheel of the planetary transmission drives the guide body and the other output of the planetary transmission drives the drive gear for driving the drive roller in rotation.

7 Claims, 5 Drawing Sheets

DRIVE ROLLER UNIT

BACKGROUND OF THE INVENTION

One form of a drive roller unit for driving an article such as a freight container on a conveyor track, as disclosed in U.S. Pat. No. 4,792,037, comprises a drive roller which can be driven in rotation by an electric motor means by way of a planetary transmission and a transmission arrangement and which is mounted rotatably on a guide body by means of which it is movable relative to a base between a lower rest position and an upper drive position in which it is in engagement with the underside of the article to be driven. The transmission arrangement includes a drive gear which can be driven by the electric motor means and the axis of rotation of which is arranged stationarily with respect to the base, the drive roller being substantially in the form of a hollow circular cylinder and the electric motor means, the guide body, the planetary transmission and the transmission arrangement being arranged in the interior of the hollow cylindrical drive roller. The guide body has circular-cylindrical outside peripheral surface regions which are arranged eccentrically with respect to the axis of rotation of the drive gear and on which the drive roller is concentrically mounted, while disposed non-rotatably at the inside of the hollow cylindrical drive roller is an internal gear ring which is concentric with respect thereto, and is driven by the drive gear in the same direction.

The stator of the electric motor means, which includes the field winding, is rigidly and non-rotatably connected to a stator housing which serves as the guide body whose circular-cylindrical outside peripheral surface, as mentioned above, is arranged eccentrically with respect to the axis of rotation of the drive gear. With that design configuration, when the motor means is switched on, the rotor which is disposed in the interior of the stator initially remains in a stationary condition because of its inherent inertia so that the motor torque which acts between the stator and the rotor rotates the stator arrangement and therewith the guide body formed by its housing, around the axis of rotation of the drive gear, which axis has been stated as being stationary with respect to the base of the unit. As a result, because the guide body is eccentric with respect to the axis of rotation of the drive gear, the drive roller which is mounted on the guide body is moved out of its lower rest position into the upper operative position in which it comes to bear against the bottom of the article to be conveyed, which is disposed above it.

A problem with a design configuration of that kind is that the stator arrangement which includes the field winding must rotate at least over a limited angle of rotation, in operation of the drive roller unit. Therefore, a slip ring assembly of expensive configuration has to be provided for the supply of current to the field winding of the stator arrangement. A slip ring assembly of that kind not only complicates the construction of the drive roller unit but it also has a tendency to suffer from fouling and susceptibility to trouble, so that the periods between maintenance operations have to be short.

A further drive roller unit as disclosed in U.S. Pat. No. 3 698 539 has a base or main frame which is to be secured for example to the floor of an aircraft freight compartment, and a mounting frame structure which is mounted at one end pivotably to the base or main frame. In the vicinity of the pivot axis, the mounting frame structure carries a motor while at a spacing relative to the pivot axis it has a drive roller which is mounted in such a way as to be rotatable about an axis which is stationary with respect to the mounting frame structure, as well as a cam control arrangement which is connected to the free end of the mounting frame structure and by means of which the mounting frame structure is pivotable relative to the main frame from the rest position into the operative position. The output shaft of the motor is connected by way of a transmission train to the input of a planetary transmission, of which one output is coupled by way of a transmission arrangement to the drive shaft of the drive roller while the other output of the planetary transmission drives the cam control unit.

In the rest condition, the mounting frame structure lies on the main frame so that the drive roller is disposed in a lowered condition at a spacing from the bottom of a freight container positioned above same on a roller conveyor track. In order to set the freight container in movement on the roller track, the motor is firstly switched on, to drive the input of the planetary transmission. At that time the drive roller is prevented from rotating by means of a slipping clutch with a predetermined braking torque so that the drive moment of the motor inevitably acts by way of the other output of the planetary transmission on the cam control unit which, as a result, by virtue of its cams which bear against the main frame, pivots the mounting frame structure upwardly into the operative position until the drive roller comes into engagement with the underside of the bottom of the freight container. The weight of the freight container causes the movement of the cam control unit to be blocked as the drive roller is pressed against the bottom of the container. As a result the output of the planetary transmission which drives the cam control unit is also blocked so that the other output of the planetary transmission, which is connected to the drive roller, transmits thereto a braking moment which overcomes the braking torque of the slipping clutch so that the drive roller, while being pressed against the bottom of the container, begins to rotate and the container is moved forwardly in a direction which is dependent on the direction of rotation of the drive motor.

A problem which arises with that arrangement in a practical situation is that the entire transmission arrangement from the motor to the drive roller on the one hand and to the cam control assembly on the other hand is of a very expensive design configuration and comprises a large number of components. In addition, a cam control assembly is required so that the overall construction includes a large number of mechanically moved components. As a result, not only does the arrangement involve a high level of manufacturing costs, but it is also of a large size and is of high weight which is extremely undesirable in regard to aircraft construction. Furthermore, the large number of components which are moved relative to each other gives rise to an undesirable susceptibility to wear and short periods of time between maintenance operations are required in order to guarantee the high level of reliability required in operating aircraft.

Furthermore, the slipping clutch used in that drive roller unit is what is known as a 'fluid friction clutch', the operating characteristics of which are highly dependent on temperature. Due to the high temperature differences which may occur in operation in the freight compartment of an aircraft it is therefore necessary for the maximum torque of the slipping clutch to be selected at such a high level that the torque does not fall below the necessary minimum value, even under the most disadvantageous temperature conditions. However that gives rise to high force peaks when initiating the rotary movement of the drive roller when it is in the condition of being pressed against the bottom of the container, and those force peaks act on the floor structure of the freight compartment of the aircraft. That is extremely undesirable in practice as certain floor structure limit loadings should not be exceeded and in addition shock loadings are extremely undesirable.

In particular, however, the above-discussed drive roller unit is of a really large size and the individual components thereof are disposed more or less without protection in juxtaposed arrangement so that in operation it is not only necessary to reckon on the assembly suffering from fouling and contamination, with the operational faults which are caused thereby, but it is also susceptible to damage caused by objects penetrating into the mechanism or due to the direct action of a force thereon.

A drive roller unit which is similar in terms of design and mode of operation is to be found in U.S. Pat. No. 4,697,694 which, besides being of large size, the arrangement may also suffer in operation from problems due to foreign bodies penetrating into the mechanism or due to the effect of a force acting thereon.

SUMMARY OF THE INVENTION

An object of the present invention is to provide a drive roller unit which enjoys enhanced reliability and which is of a simplified design configuration.

Another object of the present invention is to provide a drive roller unit which affords better protection from fouling and susceptibility to damage.

Still another object of the present invention is a drive roller unit which is of a compact construction suited to use in an aircraft environment.

These and other objects are attained by a drive roller unit in accordance with the principles of the present invention.

The design configuration of the drive roller unit according to the invention provides that the moving components, the transmission assemblies, the drive motor and the guide body, are disposed in the interior of a hollow-cylindrical drive roller so that all those elements are protected from fouling and damage. More particularly however it is provided that one element of the electric motor is rigidly and non-rotatably connected to the base. If that motor element includes the field winding of the electric motor, the field winding can therefore be directly connected to the current supply of the base of the unit so that there is no need for contact arrangements or expensive slip rings. As generally the other motor element, the armature, is in the form of a permanent magnet armature or a squirrel-cage rotor, that second motor elements does not require any current supply at all.

The elimination of the slip ring assembly provides a considerable degree of structural simplification and a higher level of reliability in operation.

It is particularly advantageous, in the configuration according to the invention, that the entire drive roller unit can be adapted in respect of its external dimensions to the individual non-driven support rollers of a roller conveyor track and therefore can be fitted into a roller conveyor track at any positions, in accordance with the respective requirements involved, in such a way as to be interchangeable with a support roller.

If the drive roller unit according to the invention is set in operation by the supply of power to the electric motor means, then a torque acts between the first motor element and the second motor element of the electric motor means. As the first motor element is rigidly and non-rotatably fixed to the base, the second motor element necessarily begins to rotate so that a torque is applied to the input of the planetary transmission.

The one output of the planetary transmission, namely the planet carrier which is connected to the drive wheel is prevented from rotating in that condition by a braking torque which is afforded for example by the friction of the transmission arrangement and the inherent inertia of the drive roller. For that reason the drive wheel initially remains in a stationary condition and the second output of the planetary transmission, namely the crown wheel which is fixedly connected to the guide body begins to rotate so that the eccentric guide body begins to rotate about the axis of rotation of the drive wheel and thereby the drive roller mounted thereon is moved out of its lower rest position into its upper operative position in which it comes to bear against the bottom of an article to be driven, which is disposed above same. The guide body can therefore not rotate any further so that the torque of the electric motor means now overcomes the braking torque at the drive wheel and begins to rotate the latter. That rotary movement of the drive wheel is transmitted directly to the drive roller so that it is caused to rotate in the same direction. As the drive roller is pressed against the bottom of the article to be conveyed, a tangential conveying force is applied thereto so that it begins to move on the roller track in the desired manner. As a reaction force, the article applies to the drive roller which is driving same, a braking moment which causes the guide body and the drive roller mounted thereon to continue to be urged upwardly into the operative position against the bottom of the article.

When the electric motor means is switched off, its drive torque vanishes so that the drive roller comes to a halt and, because of the eccentric distribution of weight of the arrangement, pivots downwardly back into the rest position, together with the guide body.

In a preferred feature of the invention, the sun gear of the planetary transmission is in the form of an external tooth configuration on the shaft of the second motor element.

In another preferred configuration, of compact size with a small number of parts, at least one planet wheel of the planetary transmission meshes both with the sun gear and also with the crown wheel and the crown wheel is in the form of an internal tooth configuration in an opening which is formed in the guide body in concentric relationship with the axis of rotation of the drive gear.

For certain constructions, it may be preferable for the first motor element which is rigidly and non-rotatably connected to the base to concentrically enclose the second motor element, because in that case the output shaft of the second motor element can be provided directly as the input sun gear of the planetary transmission.

As an alternative thereto it may be advantageous for the first motor element which is rigidly connected to the base to be arranged concentrically within the second motor element.

Preferably the first motor element includes the field winding of the electric motor means and the second motor element includes the armature so that the supply of power which is required for the field winding can be provided by fixed immovable conductors without involving an expensive contact and slip ring assembly.

Especially if the aspect of saving weight is of quite particular importance and therefore the inherent inertia of the drive roller, which is governed by the weight thereof, is to be kept at a low level, it may be advantageous if the drive gear is subjected, relative to the base, to a predetermined braking torque which can be produced for example by a brake which is operative between the drive gear and the base.

Further objects and features of the invention will be apparent from the following description of preferred embodiments.

DESCRIPTION OF PREFERRED EMBODIMENTS

Figure 1:
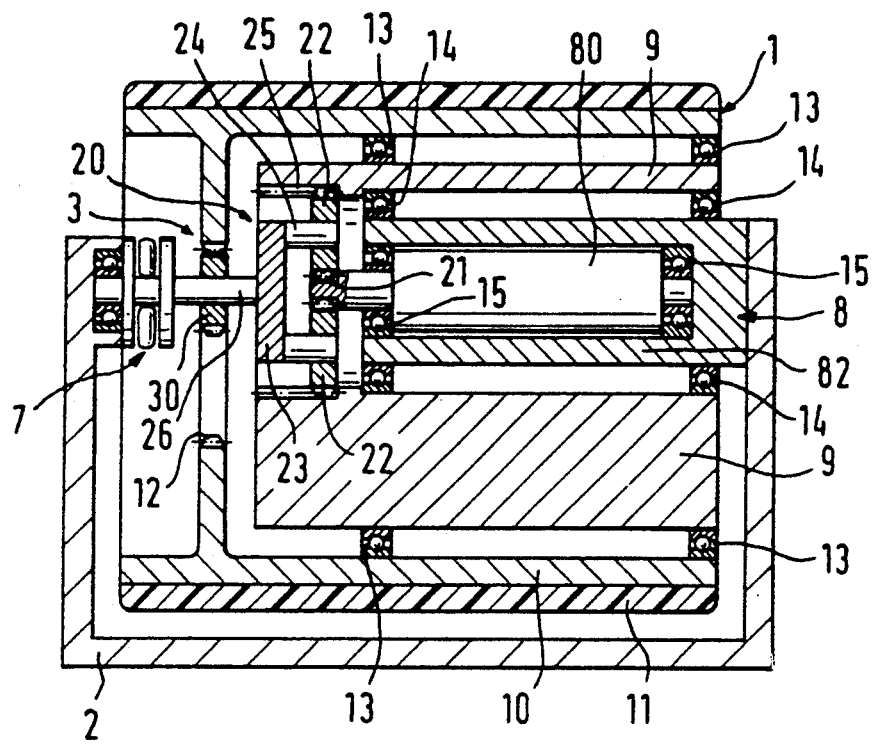
FIG. 1 is a highly diagrammatic vertical longitudinal section of a first embodiment of a drive roller unit according to the invention.

Referring to FIG. 1, the basic construction and the mode of operation of a first embodiment of a drive roller unit according to the invention will first be described. FIG. 1 is shown in highly simplified and diagrammatic form for the purposes of the description.

As shown in FIG. 1, the drive roller unit basically comprises a drive roller 1 which is substantially in the form of a hollow circular cylinder and the interior of which accommodates a guide body 9 and a motor means 8 which is drivingly coupled by way of a planetary transmission 20 and a transmission arrangement 3 to the guide body 9 and the drive roller 1 respectively. The entire drive roller unit is accommodated in abase 2 which is fixed in a roller conveyor track.

The electric motor means 8 includes a stator 82 which is rigidly and non-rotatably fixed to the base 2 and which includes the field winding of the electric motor means 8 which is connected by way of fixed electric conductors to the power supply of the base 2. The electric motor means 8 also includes a rotor 80 which is rotatably mounted concentrically within the stator 82 by means of the rolling bearings 15. The end of the rotor shaft which is at the left in FIG. 1 is provided with an external tooth configuration which forms the sun gear 21 of a planetary transmission 20, for driving same. The guide body 9 has a substantially circular-cylindrical outside surface and a through bore which is arranged eccentrically with respect to the cylindrical outside surface and which accommodates the electric motor means 8 and the planetary transmission 20. The guide body 9 is mounted rotatably by means of rolling bearings 14 on the outside surface of the stator 82 of the electric motor means 8.

The planetary transmission 20 has a plurality of planet gears 22 which are mounted rotatably on mounting trunnions or stub axles 24 of a planet wheel carrier 23 and which mesh on the one hand with the sun gear 21 and on the other hand with an internal tooth configuration in the central bore in the guide body 9, the internal tooth configuration being in the form of a crown wheel 25. The planet wheel carrier 23 is fixedly connected to a shaft 26 which non-rotatably carries the drive gear 30 of the transmission arrangement 3. The left-hand end of the shaft 26 is mounted in the base 2 and is coupled to a brake 7 which brakes the shaft 26 and therewith also the drive gear 30 relative to the base 2, with a predetermined braking moment.

The drive roller 1 comprises an inner roller body 10 which is substantially in the form of a hollow cylinder and a roller casing portion 11 of elastic material, which covers the outside surface of the roller body 10. Formed on the inner surface of the roller body 10 in the vicinity of an axial end (at the left in FIG. 1) is an internal gear ring 12 which is disposed concentrically with the roller body 10 and which is in meshing engagement with the drive gear 30 which is eccentric with respect thereto. The drive roller 1 is mounted rotatably on and in concentric relationship with the circular-cylindrical outside surface of the guide body 9, which is eccentric with respect to the axis of rotation of the drive gear 30, by means of the bearings 13 which are in the form of needle or ball bearings, so that on the one hand meshing engagement of the drive gear 30 with the internal gear ring 12 is constantly ensured and at the same time the eccentric arrangement of the drive roller 1 and the internal gear ring 12 with respect to the axis of rotation of the drive gear 30 is maintained.

FIG. 1 shows the rest position of the drive roller in the lowered condition of being out of engagement with an article (not shown) to be conveyed, which is supported on the associated roller conveyor track.

If now, starting from that rest condition, the supply of power to the electric motor means 8 is switched on, then, as in any other electric motor, a torque acts as between the rotor 80 and the stator 82. As the stator 82 is rigidly and non-rotatably connected to the base, the rotor 80 begins to rotate and drives the planetary transmission 20 by way of the sun gear 21 as its input. The one output of the planetary transmission, the shaft 26 of the planet wheel carrier 23, is rigidly and non-rotatably connected to the drive gear 30 which meshes with the internal gear ring 12 of the drive roller 1. Because of the inertia of the drive roller and in addition because of the brake 7 which brakes the drive gear 30 with respect to the base, a rotary movement of the shaft 26 of the planet wheel carrier is initially prevented so that it remains in a stationary condition. In contrast the other output of the planetary transmission 20, namely the crown wheel 25, begins to rotate, and as the crown wheel 25 is fixedly connected to the guide body 9, the guide body 9, mounted with the rolling bearings 14 on the stator 82, rotates about the axis of rotation of the drive gear 30 so that its outside surface which is eccentric with respect to that axis of rotation and the drive roller 1 which is mounted on said outside surface by means of the rolling bearings 13 pivot upwardly into their operative position until the drive roller 1 comes to bear against the underside of the article to be conveyed, which is disposed on the conveyor track. Due to the weight of that article, further movement of the drive roller in an upward direction is blocked so that the guide body 9 also cannot move any further. Because of that blocking of the output of the planetary transmission 20, which drives the guide body 9, an increased torque of the electric motor means is now directed to the other output of the planetary transmission 20, that is to say to the shaft 26, so that that torque finally overcomes the blocking braking moment which was caused by the inertia of the drive roller and the brake 7. As a result the drive gear 30 begins to rotate and drives the drive roller in the same direction by way of the internal gear ring 12. The rotary movement of the drive roller, caused thereby, with the drive roller being pressed against the underside of the article to be conveyed, applies a tangential force to the article so that the article begins to move, as is desired.

If, starting from that driving condition which has now been attained, the supply of power to the electric motor means 8 is switched off, the rotor 80 of the electric motor means comes to a halt relative to the stator 82 which is rigidly connected to the base so that the torque applied to the drive roller by the drive gear 30 disappears, and similarly for the drive torque of the crown wheel 25 which rotates the guide body 9 upwardly. Because of the eccentric distribution of weight, the guide body 9 therefore pivots back into its rest position as shown in FIG. 1 and entrains the drive roller 1 in the course of that pivotal movement so that the drive roller 1 comes out of engagement with the bottom of the article to be conveyed.

As shown in FIG. 1, the arrangement described may include a brake 7 which causes a braking torque to take effect as between the base 2 and the drive gear 30. The brake serves to assist with holding the drive gear 30 in the initial stationary condition when the supply of power to the electric motor means 8 is switched on in the rest position of the drive roller 1. Although that brake is not absolutely necessary, it does however provide for a defined braking moment which acts on the shaft 26 of the planetary transmission 20 so that the drive moment of the motor is initially directed to the guide body 9 by way of the crown wheel 25. That means that the drive roller 1 can be of low weight and therefore also has a low level of inertia.

As diagrammatically indicated, the optional brake 7 is in the form of a mechanical roller-type friction brake in which a plurality of braking rollers are disposed in a spring-biased condition between mutually rotatable brake discs, and are arranged in a distributed configuration inclinedly over the periphery of the brake discs.

A practical configuration of a first embodiment of the drive roller unit according to the invention, the practical configuration being shown in simplified form in respect of many detail features thereof, will now be described with reference to FIGS. 2 to 6.

Figure 2:
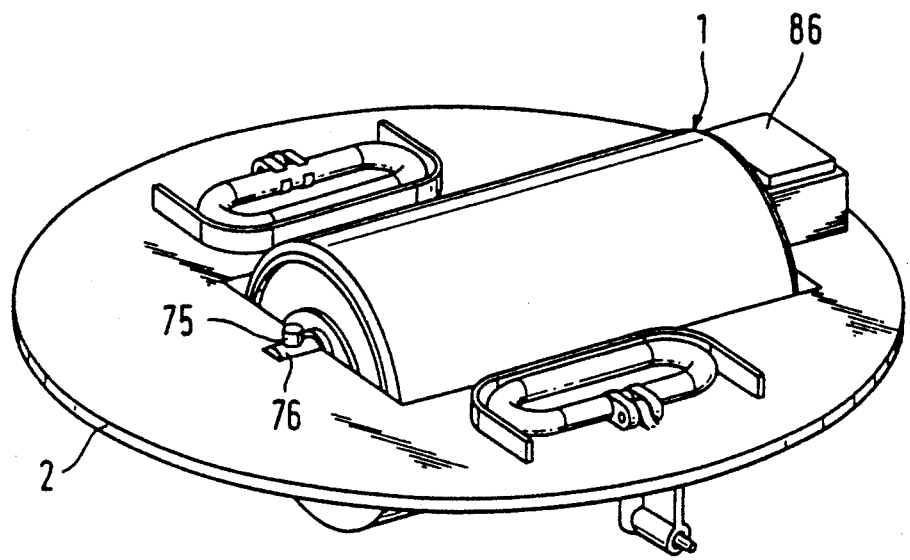
FIG. 2 is a perspective view of the drive roller unit mounted in its base.

As the perspective view in FIG. 2 shows, the drive roller unit is mounted in a base 2, more specifically at the end which is at the left in FIG. 2 by means of a fixing pin 75 which non-rotatably holds a mounting trunnion portion 76, and at the right-hand end, by means of a connecting housing 86. In that arrangement the drive roller 1 is accommodated in an opening in the base 2 in such a way that it can both rotate and also pivot from its rest position shown in FIG. 2 upwardly into its operative position in which it bears against the underside of the article to be driven.

Figure 3:
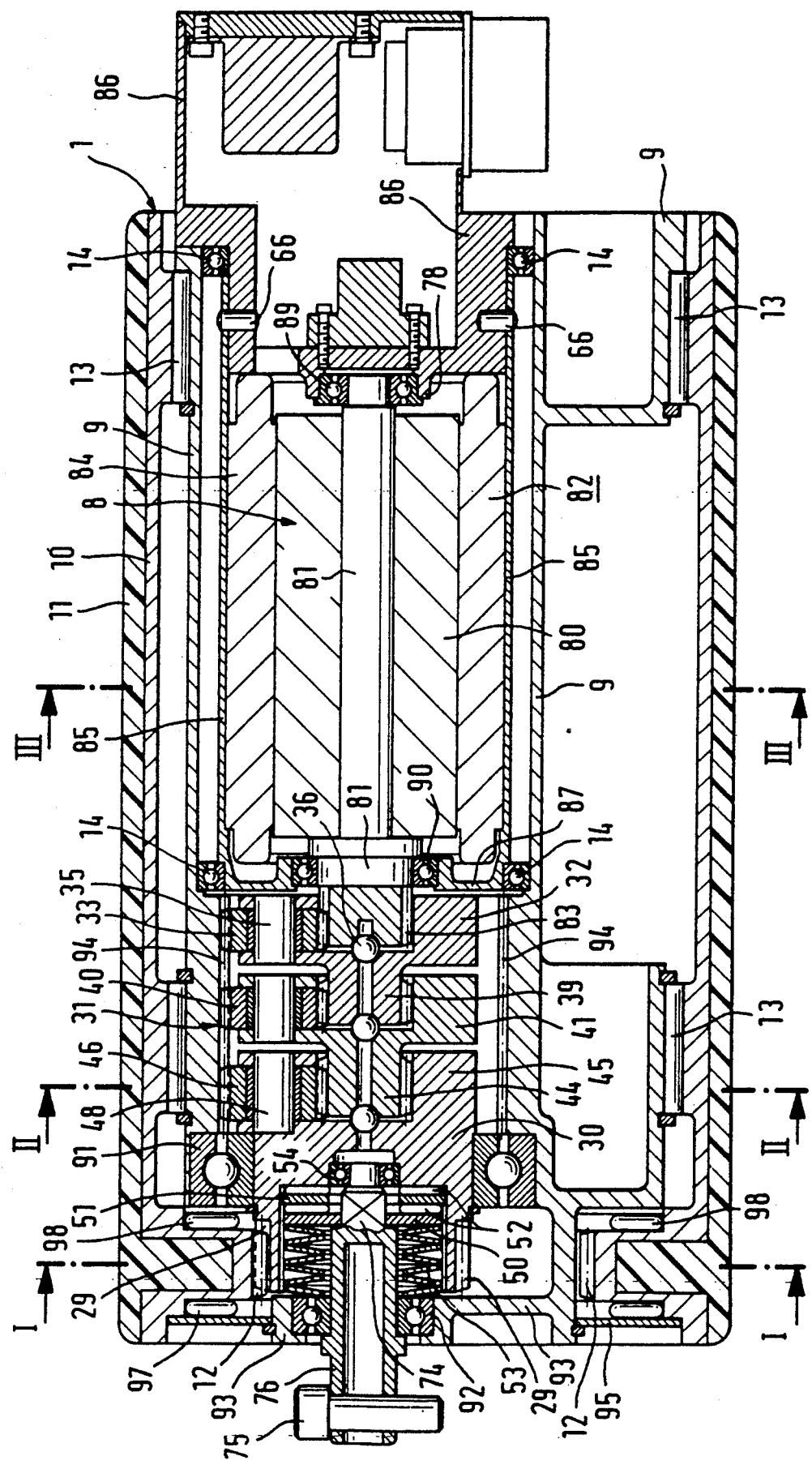
FIG. 3 is a simplified view in longitudinal section of a practical construction of the first embodiment of the drive roller unit shown in FIG. 1.
Figure 4:
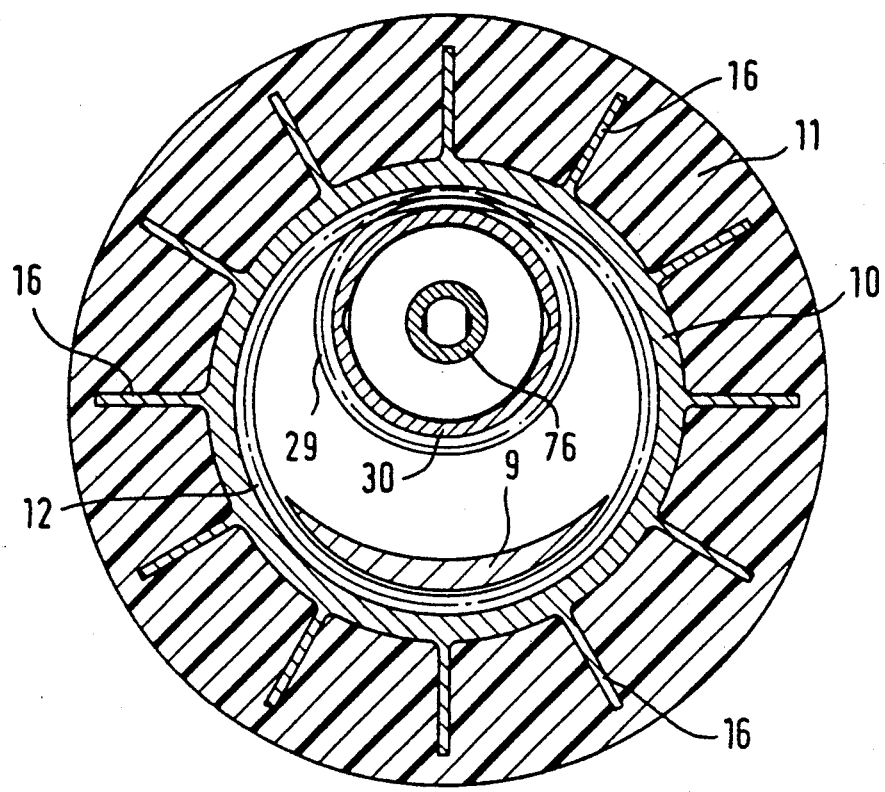
FIG. 4 is a view in vertical radial section taken along line I—I in FIG. 3.
Figure 5:
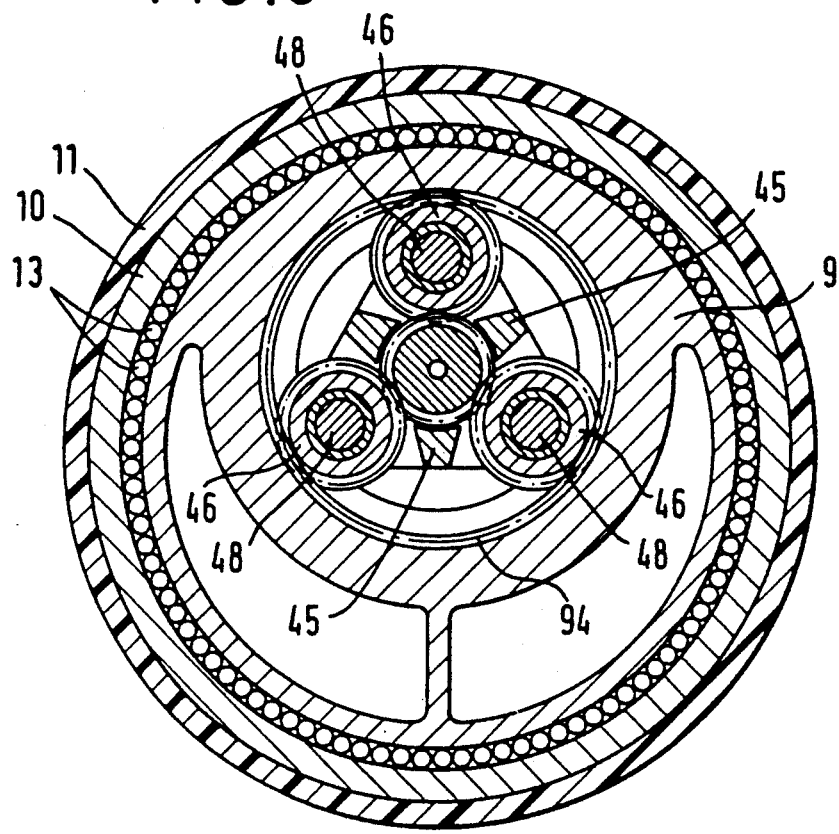
FIG. 5 is a view in radial vertical section taken along line II—II in FIG. 3.
Figure 6:
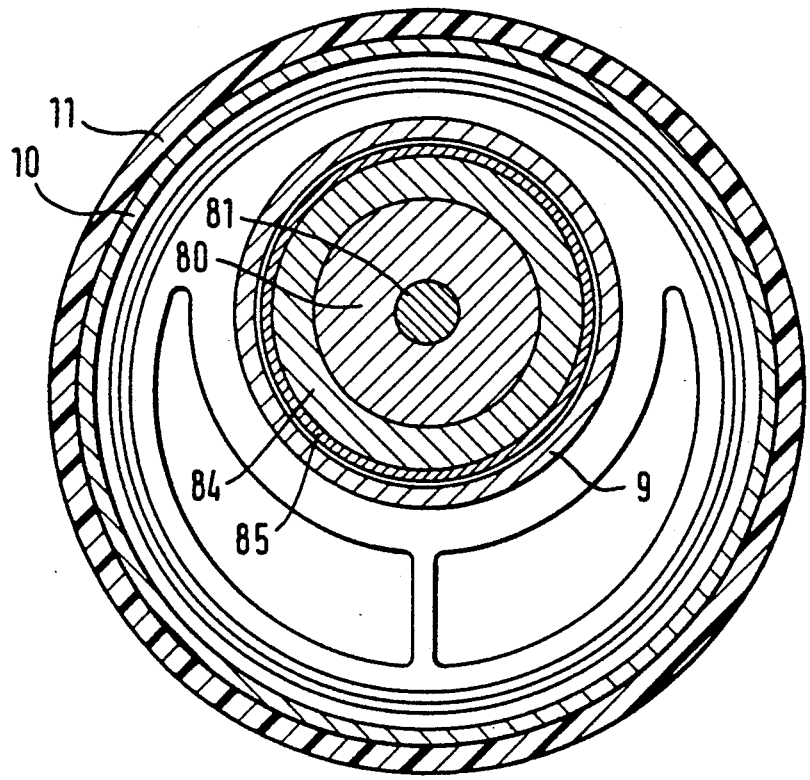
FIG. 6 is a view in radial vertical section taken along line III—III in FIG. 3.

As shown in particular in FIG. 3 and in the radial sections associated with FIG. 3, as illustrated in FIGS. 4, 5 and 6, this embodiment of the drive roller unit includes an outer drive roller 1 which is rotatably mounted by means of the rolling bearings 13 on cylindrical outside surface regions of a guide body 9. An opening which passes through the guide body 9 in eccentric relationship with those outside surface regions, in the region of the rolling bearings 13, accommodates an electric motor means 8, a planetary transmission 31, the transmission arrangement 3 and a brake 7.

The electric motor means 8 includes a stator 82 which comprises a stator body 84 including the field winding (not shown) of the electric motor means 8, and a stator housing 85 which is fixedly connected to the stator body 84, as well as a rotor 80 which is rotatably accommodated in concentric relationship within the stator 82. The stator housing 85 is fixedly connected by means of pins 66 to a connecting housing 86 at the end of the stator housing which is at the right in FIG. 3. The housing 86 is in turn fixedly mounted on the base 2 in operation so that the stator 82 is also rigidly and non-rotatably connected to the base 2 (see FIG. 2) in operation of the assembly. Mounted on the outside of the connecting housing 86 and adjoining the stator housing 85 is a rolling bearing 14, together with a further rolling bearing 14 on the outside of the end of the stator housing 85 which is at the left in FIG. 3. The guide body 9 which encloses the motor means 8 is rotatably mounted on the rolling bearings 14.

The connecting housing is in the form of a hollow body which serves on the one hand for fixing to the base 2 and on the other hand for providing for the supply of power to the field winding of the stator 82 of the electric motor means 8. Disposed in the interior of that hollow body are a series of diagrammatically indicated components such as a thermally operated protective circuit breaker and the like, as well as for example a connecting plug for the power connection to the base.

Arranged in the interior of the stator 82 is the rotor 80, the rotor shaft of which is indicated at 81. The end of the rotor shaft 81 which at the right in FIG. 3 is rotatably mounted by means of a rolling bearing 89 in an associated mounting projection 78 on the connecting housing 86. The end of the rotor shaft 81 which is at the left in the drawing is rotatably mounted by means of a rolling bearing 90 in a mounting flange 87 which is formed on the stator housing 85 so that in operation the rotor 80 can rotate relative to the stator 82 and relative to the base 2.

As already mentioned, the guide body 9 which encloses the electric motor means 8 is rotatably mounted by means of the rolling bearings 14 on the one hand on the connection housing 86 and on the other hand on the outside of the stator housing 85. The axial end of the guide body 9 which is at the left in FIG. 3 is provided with a radial mounting flange 93 which rotatably mounts the guide body 9 by way of a further rolling bearing 92 on a mounting trunnion portion 76 which can be fixedly connected to the base 2 by the fixing pin or bolt 75. It should be noted in that respect that the bearings 92 and 14 are concentric relative to each other but are eccentric with respect to the cylindrical outside peripheral surfaces of the guide body 9, which mount the rolling bearings 13.

The drive roller 1 is substantially in the form of a hollow circular cylinder which surrounds the guide body 9. The drive roller 1 comprises a roller body 10 and a roller casing portion 11 which covers the outside surface of the roller body 10 and which is fixedly connected thereto. The roller casing portion 11 comprises a wear-resistant elastic plastic material while the roller body 10 is made from metal. The rolling bearing 13, preferably a needle bearing, which rotatably mounts the roller body 10 on the cylindrical peripheral surfaces of the guide body 9, is disposed in the vicinity of each of the two axial ends of the roller body 10, at the inward side of the roller body 10. The region of the roller body 10 which adjoins the end which is at the left in FIG. 3 is provided with a radially inwardly projecting portion of greater radial thickness, while formed at the inwardly facing surface of that region is an internal gear ring 12 which is disposed concentrically with respect to the longitudinal axis of the hollow-cylindrical roller body 10. As shown in particular in the associated sectional view in FIG. 4, the region of the roller body which carries the internal gear ring 12 is formed with radial ribs 16, for the purposes of saving weight. The radially inwardly projecting region, which carries the internal gear ring 12, of the roller body 10 is supported at the two ends by means of the respective thrust bearings 97 and 98 on the one hand against a radial shoulder of the guide body 9 and on the other hand against a loosely disposed bearing plate 95 so that the drive roller 1 has the axial support effect which is required when the drive roller unit is installed in an inclined position.

Disposed within the opening passing through the guide body 9, to the left in FIG. 3 of the mounting flange 87 which mounts the rotor shaft 81, is a planetary transmission with three transmissions stages which are disposed in succession in the axial direction. The planetary transmission 31 is of a conventional design configuration from the point of view of the function thereof so that the following brief description will be sufficient for the man skilled in the art. The planetary transmission 31 includes in the first stage a planet wheel carrier 32 on which three planet wheels 33 are mounted by means of mounting trunnions or stub axles 35. The planet wheels 33 rotate on a sun gear which is formed by an external tooth configuration 83 on the left-hand end of the rotor shaft 81. The arrangement and configuration of that first transmission stage is comparable to the radial sectional view of the third transmission stage, which is shown in FIG. 5.

Axially towards the left in FIG. 3, formed on the first planet wheel carrier 32 and in one piece therewith is the sun gear 39 of the second transmission stage on which the planet wheels 40 mounted on mounting trunnions or stub axles on the planet wheel carrier 41 in turn rotate. Also towards the left in FIG. 3, formed in one piece on the second planet wheel carrier 41 is the sun gear 44 on which the planet wheels 46 of that third transmission stage rotate, the planet wheels 46 being rotatably mounted on the planet wheel carrier 45 by means of mounting trunnions or stub axles 48. A mounting ball 36 is arranged between the left-hand face of each sun gear and the associated surface, which follows same towards the left, of the respective planet wheel carrier, in order to ensure that those adjacent components are freely rotatable relative to each other, with a low level of friction. As shown in FIGS. 3 and 5, all the planet wheels 33, 40 and 45 are in meshing engagement with a crown wheel which is disposed around them and which is in the form of an internal tooth configuration 94 on the guide body 9. The part of the planet wheel carrier 45 of the third transmission stage, which projects towards the left in FIG. 3, carries a rolling bearing 91 on which the guide body 9 is rotatably mounted and which is arranged concentrically with respect to the rolling bearings 92 and 14.

Projecting axially towards the left in FIG. 3, the drive gear 40 is either formed in one piece on the planet wheel carrier 45 of the third transmission stage of the planetary transmission 31, or the drive gear 30 is fixedly connected to the planet wheel carrier 45. The drive gear 30 is in the form of a substantially hollow-cylindrical body carrying an external tooth configuration 29 which is in meshing engagement with the internal gear ring 12, which is eccentric with respect thereto, of the roller body 10 of the drive roller 1.

Arranged in the interior of the hollow-cylindrical body of the drive gear 30 is a brake 7 which is in the form of a mechanical roller-type friction brake and which brakes the drive gear 30 relative to the base 2 in a defined manner and with a predetermined braking torque. As can be seen from FIG. 3, the drive gear 30 is rotatably mounted by means of a rolling bearing 54 on the axially right-hand end of the mounting trunnion portion 76 which is fixedly connected to the base 2. The rolling bearing 54 is in turn arranged concentrically with the rolling bearings 92, 91 and 14 which rotatably mount the guide body 9.

The brake 7 includes two brake discs 50 and 51. The brake disc 50 is arranged non-rotatably but axially displaceably on a square portion 74 of the mounting trunnion portion 76 while the second brake disc 51 is non-rotatably connected to the drive gear 30. Respective pluralities of circumferentially distributed brake rollers 52 are arranged between the two brake discs 50, 51 and the right-facing surface of the brake disc 51 and the adjacent wall of the drive gear 30 respectively. Arranged between the left-facing surface of the brake disc 50 and the rolling bearing 92 which is supported on the base 2 is a plurality of diaphragm springs 53 which bias the brake disc 50 towards the right so that the rollers 52 are clamped between the brake discs 50, 51 and the drive gear 30 in a predetermined manner so that, upon rotary movement of the two brake discs 50, 51 relative to each other, the rollers 52 provide for a predetermined braking moment which is operative between the base 2 and the drive gear 30. A roller-type friction brake of that kind is known per se in regard to function and structure and does not therefore need to be described in greater detail for the man skilled in the art.

The mode of operation of the embodiment just described above has already been described in detail with reference to the diagrammatic view in FIG. 1. In that connection the important consideration from the point of view of the mode of operation is that a motor element of the electric motor means 8 is non-rotatably and rigidly connected to the base while the other motor element drives the input of a planetary transmission. The drive roller 1 is rotatably mounted on a guide body 9 which has an outside surface which is eccentric with respect to the drive gear, for mounting the drive roller 1. The guide body 9 is in turn rotatably mounted on the outer motor element of the electric motor means 8 and is coupled to the motor means by way of the one output of the planetary transmission while the other output of the planetary transmission drives the drive gear 30.

Figure 7:
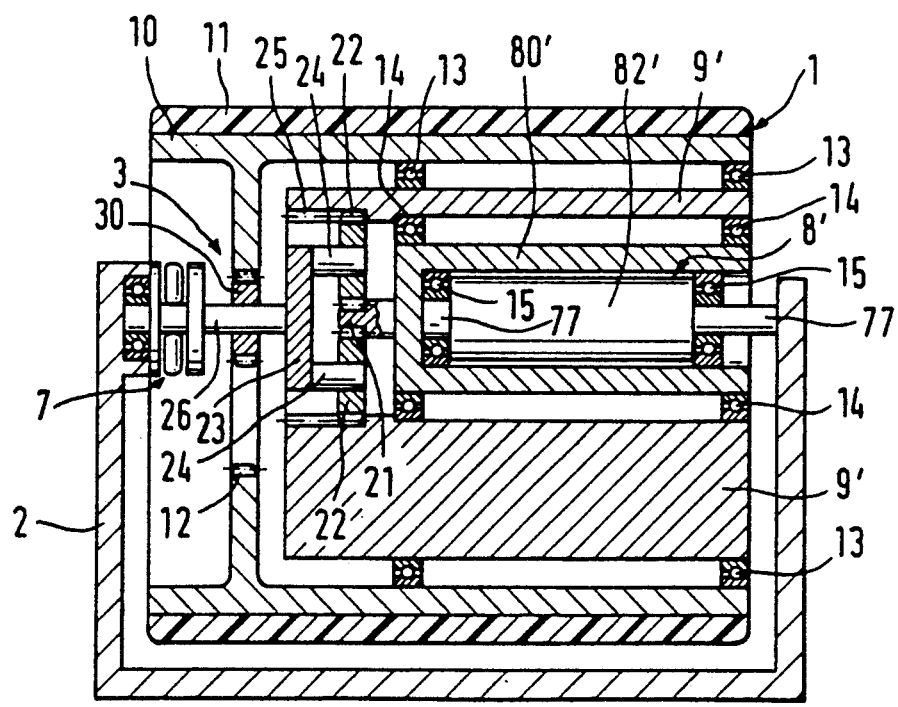
FIG. 7 is a highly diagrammatic vertical longitudinal section of a second embodiment of the drive roller unit.

The second embodiment of a roller drive unit, which is shown in highly simplified and diagrammatic form in FIG. 7 differs from the first embodiment shown in FIGS. 1 to 6 essentially only in that the motor element which is rigidly and fixedly connected to the base does not concentrically surround the upwardly disposed second motor element on the outside thereof, as in the case of the first embodiment, but on the contrary the first motor element is disposed at an inward position while the motor element which is rotatable relative to the base 2 concentrically surrounds the inner motor element.

Figure 8:
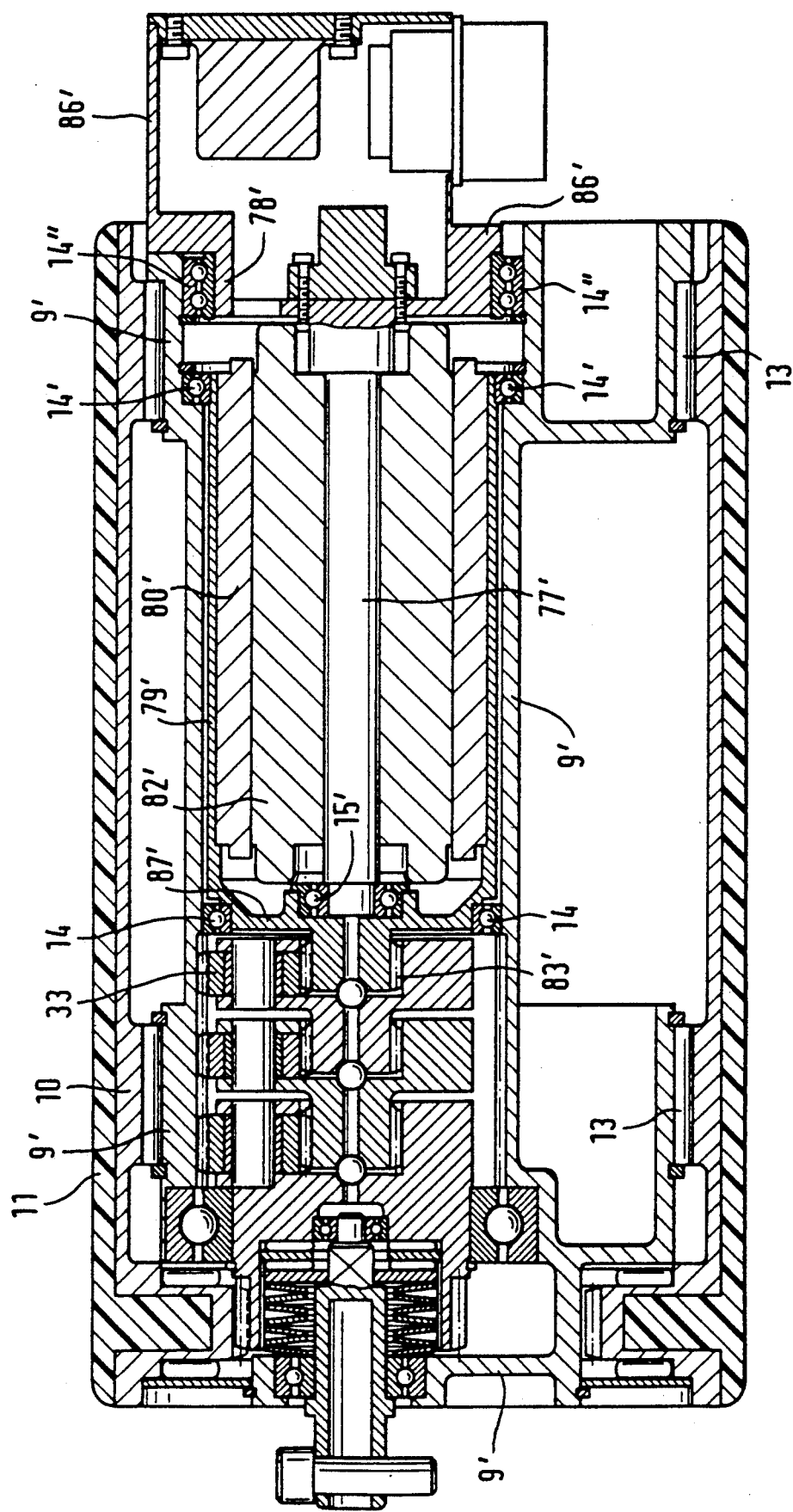
FIG. 8 is a simplified vertical longitudinal section of a practical form of the second embodiment of the drive roller unit shown in FIG. 7.

In FIG. 7 and also in FIG. 8 which is related thereto, parts which correspond to the corresponding parts of the first embodiment are identified by the same references while parts which differ or are modified in relation thereto are identified by references which include one or more primes.

As illustrated in FIG. 7, this embodiment therefore provides that the stator 82' is non-rotatably and rigidly connected to the base 2, by means of its stator shaft 77'. The stator 82' includes the field winding of the motor means so that the supply of current can be effected directly by way of fixed lines from the base 2. The stator 82' is externally enclosed concentrically with respect to its shaft by the rotor 80' which is mounted rotatably on the stator shaft 77' by means of the bearings 15. The sun gear 21 of the planetary transmission 20 is connected to the end of the rotor 82' which is at the left in FIG. 7. In other respects the embodiment shown in FIG. 7 is of an identical construction to the embodiment shown in FIG. 1. The mode of operation is also almost identical: if, starting from the rest condition shown in the drawing, the supply of power to the electric motor means 8' is switched on, a torque is operative as between the rotor 80' and the stator 82'. As the inwardly disposed stator 82' is rigidly and non-rotatably connected to the base 2, the outwardly disposed rotor 80' begins to rotate and drives the planetary transmission 20 by way of the sun gear 21 as the input. As described hereinbefore with reference to the embodiment shown in FIG. 1, in that way the drive roller 1 is firstly pivoted by the guide body 9' out of its rest position into its upper drive position and then, after it comes to bear against the underside of the article to be conveyed, the drive roller 1 begins to rotate.

A practical construction of the second embodiment of the drive roller unit according to the invention, which is simplified in regard to many details, is illustrated in FIG. 8. In this case also parts which differ from the corresponding parts of the form of the first embodiment illustrated in FIG. 3 are denoted by references with a prime.

Therefore only a few detail features will be set forth at this stage, in order to explain the structural differences:

At the end which is towards the right in FIG. 8, the inwardly disposed stator 82' is rigidly connected to the connecting housing 86' by way of the stator shaft 77' which is non-rotatably connected to the stator. The housing 86' is in turn rigidly and non-rotatably connected in operation to the base 2. The field winding of the electric motor means, which is contained in the stator 82', is connected to the power supply of the base 2 by way of fixed connecting lines. The stator 82' is concentrically surrounded by the rotor 80' which is fixedly connected to a rotor housing 79' which, at the end that is at the left in FIG. 8, has a radial mounting flange 87' which is rotatably mounted by way of a rolling bearing 15' on the left-hand end of the stator shaft 77'. The mounting flange 87' is also provided with an axial projection which points towards the left in FIG. 8 and which carries an external tooth configuration 83' acting as the sun gear of the first stage of the planetary transmission. The rotor 80' is mounted by way of its rotor housing 79' at the left-hand end at the inside of the opening in the guide body 9' by means of the rolling bearings 14 while at its right-hand end it is also mounted at the inside of the opening in the guide body 9' by means of the rolling bearings 14' and 14''.

As already described with reference to the diagrammatic view in FIG. 7, this second embodiment therefore differs in function and in principle from the first embodiment only in that the positions of the first and second motor elements have been interchanged relative to each other, that is to say the motor element, the stator 82', which is fixedly connected to the base, is disposed at the inward position in this second embodiment.

What is claimed is:

1. A drive roller unit for driving an article on a conveyor track comprising:
 a base (2);
 a guide body (9) having circular-cylindrical outside peripheral surface means;
 a drive roller (1) which is substantially in the form of a hollow circular cylinder and which is rotatably mounted on said outside peripheral surface means of the guide body in concentric relationship therewith;
 an electric motor means (8) operable to drive the drive roller (1) in rotation and comprising first and second motor elements (80, 82) of which one is arranged concentrically within the other, which are rotatable relative to each other and between which the torque of the electric motor means (8) acts in operation of the unit, the first motor element (82) being rigidly and non-rotatably connected to the base (2) and the second motor element (80) being mounted rotatably with respect to the base (2), the drive roller (1) and the guide body (9);
 a planetary transmission (20) and a transmission (3) operatively disposed between the electric motor means (8) and the drive roller (1), the electric motor means (8), the guide body (9), the planetary transmission (20) and the transmission arrangement (3) being arranged in the interior of the drive roller (1), the planetary transmission (20) including a sun gear (21) which is coupled to the second rotatable motor element (80), a crown wheel (25) which is coupled to the guide body (9), and a planet wheel carrier (23) coupled to an output shaft (26), and the transmission arrangement (3) including a drive gear (30) coupled to the output shaft (26) of the planetary transmission and having its axis of rotation arranged stationarily with respect to the base (2), the outside peripheral surface means of the guide body (9) being disposed eccentrically with respect to said axis of rotation of the drive gear (30), and the transmission arrangement (3) further including an internal gear ring means (12) disposed at the inside of the drive roller (1) non-rotatably relative thereto and in concentric relationship therewith and meshing with said drive gear (30) which is eccentric with respect to the gear ring means (12) to drive same in the same direction;

and means mounting the guide body (9) rotatably with respect to the electric motor means (8), the assembly being adapted by virtue of rotational movement of said guide body (9) to move said drive roller (1) relative to the base (2) between a lower rest position and an upper drive position in which the drive roller is adapted to engage with the underside of a said article to be driven which is disposed above the unit.

2. A drive roller unit as set forth in claim 1 wherein the sun wheel (21, 83) is in the form of an external tooth configuration (21, 83) on the shaft (81) of the second motor element (80).

3. A drive roller unit as set forth in claim 1 wherein at least one planet wheel (22, 33) of the planetary transmission (20) meshes both with the sun wheel (21, 83) and with the crown wheel (25) and wherein the crown wheel (25) is in the form of an internal tooth configuration (94) in an opening which is formed in the guide body (9) in concentric relationship with the axis of rotation (26) of the drive gear (30).

4. A drive roller unit as set forth in claim 1 wherein the first motor element (82) which is rigidly and non-rotatably connected to the base (2) concentrically encloses the second motor element (80).

5. A drive roller unit as set forth in claim 1 wherein the first motor element (82) which is rigidly connected to the base (2) is arranged concentrically within the second motor element (80).

6. A drive roller unit as set forth in claim 1 wherein the first motor element (82) includes the field winding of the electric motor means (8) and wherein the second motor element (80) includes the armature thereof.

7. A drive roller unit as set forth in claim 1 wherein the drive gear (30) is subjected, relative to the base (2), to a predetermined braking torque.

* * * * *